UNITED STATES PATENT OFFICE.

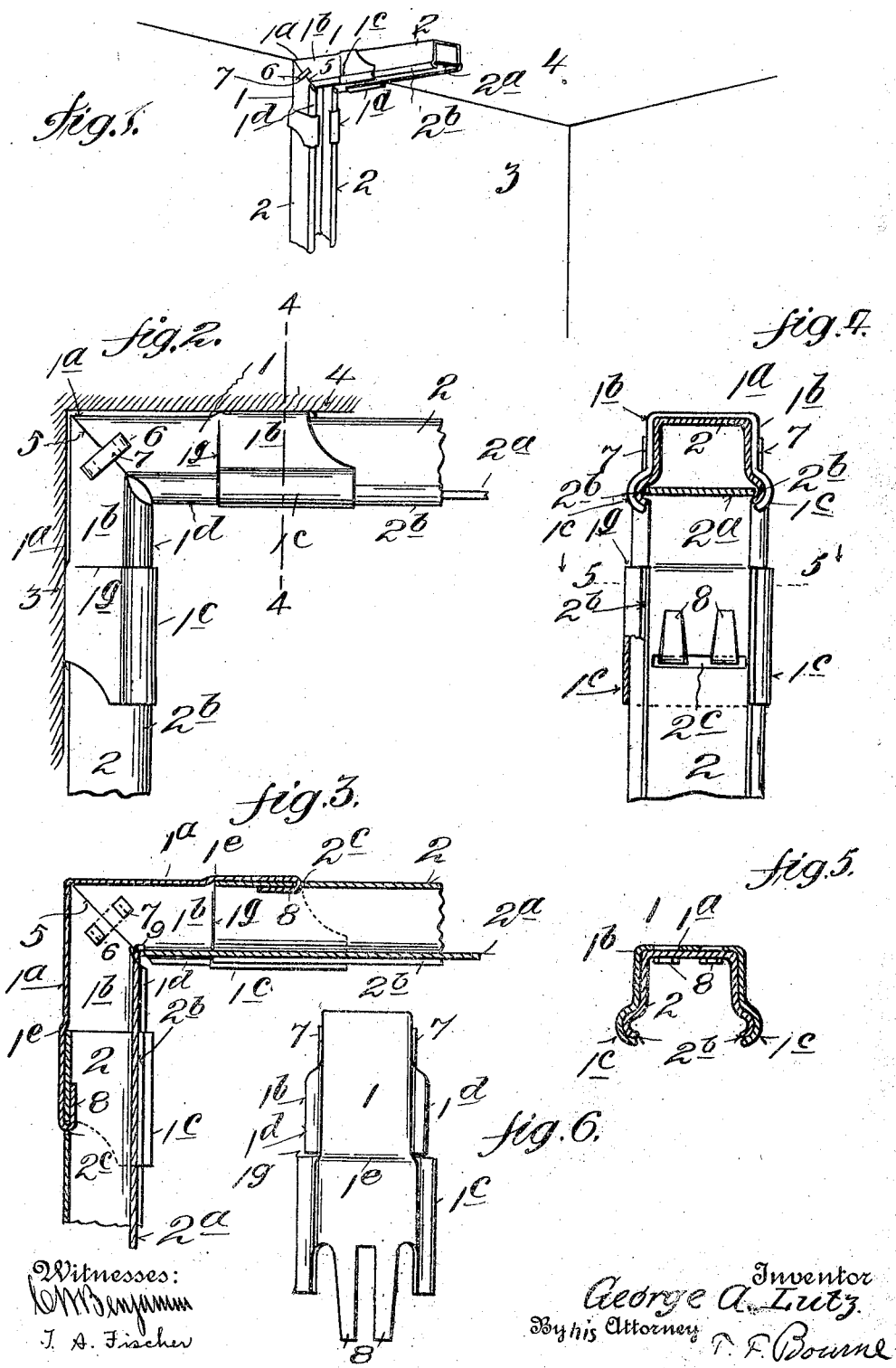

GEORGE A. LUTZ, OF PLAINFIELD, NEW JERSEY.

ELBOW FOR CONDUITS.

962,773.

Specification of Letters Patent. Patented June 28, 1910.

Application filed August 3, 1908. Serial No. 446,506.

*To all whom it may concern:*

Be it known that I, GEORGE A. LUTZ, a citizen of the United States, and resident of Plainfield, in the county of Union and State of New Jersey, have invented certain new and useful Improvements in Elbows for Conduits, of which the following is a specification.

My invention relates to improvements in elbows adapted for use in connection with metal conduits or moldings for electric conductors, and particularly adapted for making connection between such conduits where they extend at an angle to each other in the same plane, as at the angle between a wall and ceiling, whereby the open sides of the conduits face each other, suitable means being provided for closing the open sides of the elbow, all whereby the conductor may be run upwardly along a wall and extended outwardly along the ceiling within the conduits and elbow.

The invention comprises the novel details of improvement that will be more fully hereinafter set forth and then pointed out in the claims.

Reference is to be had to the accompanying drawings forming part hereof, wherein, Figure 1 is a perspective view illustrating my improvements in place, Fig. 2 is a side view thereof, Fig. 3 is a central section of Fig. 2, Fig. 4 is a cross section of part of Fig. 2, taken on the line 4, 4, in Fig. 2, part also being broken away, Fig. 5 is a section on the line 5, 5, in Fig. 4 and Fig. 6 is a rear view of the elbow.

Similar numerals of reference indicate corresponding parts in the several views.

The numeral 1 indicates, generally, an elbow shown having two members at an angle to each other, said members, as shown, extending at right angles to each other with their open sides facing each other in the same plane. The elbow is shown made of sheet metal bent into channel form and adapted to receive or enter the conduit or molding 2. The bottom walls 1ª extend at an angle to each other and the side walls 1ᵇ of each member of the elbow extend at an angle to each other, and substantially in the same plane, all whereby the open sides of the channels face each other and in the same channels, whereby the elbow may be fitted in place, as between the wall 3 and ceiling an angle, so that the conduits when joined to the elbow will extend at an angle to each other in the same plane and have their open sides facing each other in such plane. The elbow may be made of sheet metal stamped to shape, and the blank is shown cut away at a suitable angle, at 5, to permit the members of the elbow to be bent at an angle to each other. The conduits 2 are shown of the class having removable covers 2ª and provided with projecting portions 2ᵇ receiving such covers.

The side walls 1ᵇ of the elbow are shown provided with correspondingly shaped or bent portions 1ᶜ to receive projecting portions of the conduits when the latter are pushed into the members of the elbow. To accommodate the particular character of conduit shown the side walls 1ᵇ of the elbow are also provided with bent portions 1ᵈ adapted to receive the covers 2ª when the latter are pushed into the elbow members. The outer portions of the members of the elbow that receive the ends of the adjacent conduits and have the bent portions 1ᶜ are shown wider than the inner adjacent portions of the elbow to admit the conduits into said members for a suitable distance, and the inner opposed bent portions 1ᵈ of the members are shown somewhat nearer together than the opposed bent portions 1ᶜ, whereby when the projecting portions 2ᵇ of the conduit are in the bent portions 1ᶜ of the elbow, the bent or groove-like portions 1ᵈ of the elbow will be in proper line to receive the covers 2ª of the conduits.

To permit the outer portions 1ᶜ of the side walls 1ᵇ of the elbow to conveniently be made wider than the inner portions 1ᵈ the blank may be split along the lines 1ᵉ to permit the above described widening of the outer portions of the conduit, and the bottom walls 1ª of the elbow may be bent outwardly at 1ᶠ to permit the bottom walls of the conduits to be depressed within the elbow. To increase the strength of the elbow its side walls adjacent the dividing line 5 may be provided with openings 6 receiving a band or clip 7 bent back through the corresponding pair of holes to aid in holding the members of the elbow together. The ends of the conduits are preferably secured to the members of the elbow, and for this purpose I have shown the latter at their ends provided with prongs 8 that are bent back through slots 2ᶜ in the bottom walls of the conduits, although other means may be provided for securing the conduits to the elbow.

With an elbow constructed in accordance with my invention the same may be placed in the angle of a wall and ceiling, as shown in Fig. 1, and the conduits applied or attached to said elbow, whereby the open sides of the conduits face each other, and the conductors may then be placed in the conduits and pushed into the corner of the elbow, so that said conductors may pass along the wall and the ceiling and the covers 2 may then be applied and when placed with their ends adjacent or overlapping within the elbow will close the open sides of the latter. As the inner corner of the elbow is open a conductor may be readily pushed into the same from the front and does not have to be pulled around the corner. The inner end of one of the covers may be bent against the end of the other cover, as at 9 in Fig. 3, forming a rounded edge in line with a conductor.

While I have shown a construction of elbow adapting it to co-act with the particular form of conduit shown, it will be understood that changes may be made in the details of construction to adapt the elbow to conduits and variations may be made, within the scope of the appended claims, without departing from the spirit of my invention.

Having now described my invention what I claim is:

1. An elbow for conduits made in a piece of sheet metal bent into channel form having open-sided members at a right angle to each other, the open sides of said members facing each other said members being permanently maintained at a right angle to each other.

2. An elbow for conduits comprising material in channel form having members permanently maintained at a right angle to each other, the open sides of said members facing each other, and means for securing said members to conduits.

3. An elbow made in a single piece of sheet metal bent in channel form having members rigidly maintained at a right angle to each other and extending in the same plane, the bottom wall being bent and extending at a right angle, with the open sides of said members facing each other and in the same plane and means for securing said elbow to the adjacent ends of conduits.

4. An elbow in channel form having integral members permanently maintained at an angle to each other and extending in the same plane, with the open sides of said members facing each other and in the same plane, the side walls having bent portions, and conduits having bent walls engaging the bent portions of the members.

5. An elbow having open-sided members permanently maintained at a right angle to each other and extending in the same plane, with the open sides of said members facing each other and in the same plane, the side walls having bent portions, conduits having bent walls engaging the bent portions of the members, and means to close the open sides of the elbow.

6. An elbow for conduits comprising sheet material bent in channel form having members rigidly maintained at a right angle to each other, the open sides of said members facing each other, and means to close the open sides of the elbow.

7. An elbow comprising sheet material bent into channel form, the bottom wall being bent at a right angle providing two members rigidly maintained at a right angle to each other in the same plane and having open sides facing each other in the same plane, the side walls being bent to engage correspondingly shaped conduits, and means for closing the open sides of the members.

8. An elbow comprising material bent into channel form having two members permanently maintained at a right angle to each other in the same plane and having open sides facing each other in the same plane, the side walls being bent to engage correspondingly shaped conduits, means for closing the open sides of the members, and means for securing the elbow to the adjacent ends of conduits.

9. An elbow in channel form having members permanently maintained at a right angle to each other extending in the same plane and having their open sides facing each other, the side walls of the elbow being bent to receive corresponding portions of conduits and also bent to receive covers.

10. An elbow having members permanently maintained at a right angle to each other and having open sides facing each other in the same plane, combined with conduits at a right angle to each other and made in channel form having their open sides alined and facing in the same direction as the open sides of the elbow respectively, said conduits being operatively associated with the elbow, and means to close the open sides of the elbow.

11. An elbow having immovable members at a right angle to each other, and having open sides facing each other in the same plane, combined with conduits in channel form having their open sides alined and facing in the same direction as the open sides of the elbow respectively, said conduits being operatively associated with the elbow, and movable covers for the conduits.

12. An elbow having members extending at an angle to each other in the same plane and having open sides facing each other in the same plane, the side walls of said members being divided and having bent portions near the ends and bent portions within the end portions that are nearer together than the first named bent portions.

13. An elbow having members extending at an angle to each other and having open sides facing each other in the same plane, the side walls of said members being divided and having bent portions near the ends and bent portions within the end portions that are nearer together than the first named bent portions, and means for securing the elbow to conduits.

14. An elbow in channel form having members at an angle to each other, the side walls of the elbow having openings on opposite sides of their meeting edges, and loops engaging said openings to hold the parts in position.

Signed at New York city, in the county of New York, and State of New York, this 27th day of July, A. D. 1908.

GEORGE A. LUTZ.

Witnesses.
T. F. BOURNE,
T. A. FISCHER.